(12) United States Patent
Merken-Schiller et al.

(10) Patent No.: US 7,285,083 B2
(45) Date of Patent: Oct. 23, 2007

(54) METHOD OF MANUFACTURING THIN-WALLED CONTAINERS FROM FILM WEBS AND PRODUCTION FACILITY FOR CARRYING OUT THE METHOD

(75) Inventors: Richard Merken-Schiller, Dusseldorf (DE); Stefan Eberhardt, Aachen (DE); Pamela Czechowski, Muhlhausen (DE)

(73) Assignee: Mars, Inc., McLean, VA (US)

( * ) Notice: Subject to any disclaimer, the term of this patent is extended or adjusted under 35 U.S.C. 154(b) by 70 days.

(21) Appl. No.: 10/517,470

(22) PCT Filed: Jun. 13, 2003

(86) PCT No.: PCT/EP03/06232

§ 371 (c)(1),
(2), (4) Date: May 6, 2005

(87) PCT Pub. No.: WO04/000656

PCT Pub. Date: Dec. 31, 2003

(65) Prior Publication Data

US 2005/0227845 A1    Oct. 13, 2005

(30) Foreign Application Priority Data

Jun. 19, 2002 (DE) .............................. 102 27 502

(51) Int. Cl.
*B31B 1/26* (2006.01)
(52) U.S. Cl. .................... 493/267; 493/287; 53/456
(58) Field of Classification Search ............. 493/269, 493/295, 296, 297, 308, 287, 228, 267, 240; 53/455, 456, 562
See application file for complete search history.

(56) References Cited

U.S. PATENT DOCUMENTS

| | | | | |
|---|---|---|---|---|
| 3,411,698 A | * | 11/1968 | Reynolds | 383/35 |
| 3,593,622 A | * | 7/1971 | Sengewald | 493/223 |
| 3,835,754 A | * | 9/1974 | Lewyckyj | 493/346 |
| 3,967,544 A | * | 7/1976 | Brock et al. | 493/197 |
| 4,221,290 A | * | 9/1980 | Bast | 206/219 |
| 4,249,982 A | * | 2/1981 | Ausnit | 156/461 |
| 4,274,244 A | * | 6/1981 | Gilbert | 53/451 |
| 4,517,790 A | * | 5/1985 | Kreager | 53/552 |
| 4,569,474 A | | 2/1986 | Buschor et al. | |
| 4,631,905 A | * | 12/1986 | Maloney | 53/554 |
| 5,030,189 A | * | 7/1991 | Hightower | 493/186 |

(Continued)

FOREIGN PATENT DOCUMENTS

FR    2587935    4/1987

(Continued)

*Primary Examiner*—Rinaldi I. Rada
*Assistant Examiner*—Paul Durand
(74) *Attorney, Agent, or Firm*—Fulbright & Jaworski, LLP; Jan K. Simpson

(57) ABSTRACT

The present invention relates to a method of manufacturing thin-walled containers from film web. The method includes the steps of: manufacturing a tubular structure from at least one film web; forming at least one fold projecting into the tubular structure; and ultrasonically joining sections of film webs of the folded tubular structure lying flat and parallel on top of one another to form the containers. The invention also includes an apparatus for carrying out the method of the invention.

29 Claims, 6 Drawing Sheets

U.S. PATENT DOCUMENTS

| | | |
|---|---|---|
| 5,202,065 A | 4/1993 | Lenander et al. |
| 5,425,216 A * | 6/1995 | Ausnit .................. 53/410 |
| 6,062,002 A | 5/2000 | Lees et al. |
| 6,517,660 B2 * | 2/2003 | Ausnit .................. 156/270 |

FOREIGN PATENT DOCUMENTS

| | | |
|---|---|---|
| GB | 957487 | 5/1964 |
| GB | 1214709 | 12/1970 |

\* cited by examiner

METHOD OF MANUFACTURING THIN-WALLED CONTAINERS FROM FILM WEBS AND PRODUCTION FACILITY FOR CARRYING OUT THE METHOD

CROSS-REFERENCE TO RELATED APPLICATIONS

The present application is a national stage filing of PCT/EP2003/006232 claiming priority to DE 102 27 502.5 filed Jun. 19, 2002.

TECHNICAL FIELD

The invention relates to a method of manufacturing thin-walled containers from film webs and a production facility for carrying out the method.

BACKGROUND OF THE INVENTION

It is known to fill liquid consumer products in particular, such as soaps, detergents and foodstuffs in stable standing containers made of plastics material, which are known as pouches, and which are manufactured from thin-walled film webs.

In addition, DE 100 27 735 C1 teaches ultrasonic welding of overlapping film webs for sealing filled thin-walled containers.

EP 0 917 946 A3 describes a method of manufacturing standing containers made of plastics material, in which a number of welding units are used to form the various seams by heat-fusing film webs. A problem in heat-fusing is ensuring a constant seam quality. Furthermore, the tools needed are relatively complex and expensive, and it is difficult and time-consuming to adapt them to new container shapes.

The object of the present invention is therefore to provide a method of manufacturing thin-walled containers from film webs which overcomes the disadvantages of the prior art. A further object of the invention consists in providing a production facility for carrying out the method.

BRIEF SUMMARY OF THE INVENTION

The first object is achieved in accordance with the invention by a method comprising the steps of:

a) manufacturing a tubular structure from at least one film web;

b) forming at least one fold projecting into the tubular structure;

c) ultrasonically joining sections of film webs of the folded tubular structure lying flat and parallel on top of one another to form the containers.

By manufacturing a tubular structure from at least one film web and folding the structure inwards, it is possible to create a blank in a continuous production process, from which standing containers with very high tear resistance can be produced in virtually any shape desired, using universal ultrasonic welding devices.

In an advantageous embodiment, the tubular structure can be produced from a film web by folding over the film web in the longitudinal direction of the film web and joining together the adjacent lateral edges of the folded film web. In this way, the containers can be produced one after the other from a single film web in a conveyor-belt process.

In another embodiment, the tubular structure can be manufactured from two film webs of the same or different widths lying flat and parallel on top of one another, by joining together the adjacent lateral edges of the two film webs. The bottom for a container to stand on can optionally be manufactured from one film web or from the two film webs. A joint is provided on the two longer lateral edges of the film webs, in the longitudinal direction in each case. Increasing the width and designing the geometrical shape of each seam appropriately improves the stability of the container.

In a third advantageous embodiment, the tubular structure can be manufactured by placing two flat, parallel top-film webs together, one on top of the other, moving one side-film web in each case to the lateral edges of the flat, parallel top-film webs lying on top of the other, folding in the side-film webs and joining the respective mutually adjacent lateral edges of a side and top-film web.

Preferably, two diametrically opposing folds are formed in the tubular structure, each of which forms a container bottom. If the top-film webs are cut apart in the longitudinal direction, two containers per longitudinal portion can be produced in this way. In order to make optimum use of the material, the two diametrically opposing containers, especially the moulded containers with curved contours, should be symmetrical mirror images of one another. The folds are preferably W-shaped, though multiple folding (WW-shaped etc.) is also possible.

In addition, there is an advantageous method in which ultrasonic welding and ultrasonic cutting are used to shape the contours of the container in the area between the two diametrically opposing folds, and to design the area of the folds as the bottom for the container to stand on. It is, for example, possible for opposite corners of the folds to be welded together.

The quality in manufacturing the tubular structure can be improved by blowing compressed air into the at least one film web. This simplifies the formation of the folds.

It is particularly advantageous to provide an intermediate layer in the fold which is designed in such a way that the film webs are prevented from fusing in the area of the intermediate layer. In this way, film webs lying on top of one another can deliberately be only partially welded together, such as to form the bottom for a container to stand on. The intermediate layer can, for example, be a metal coating joined integrally to the at least one film web, a travelling disc rotating in the fold or a metal strip used to form the fold.

In addition, it is advantageous for the film webs to be fused together in the vicinity of their folding edges in the longitudinal direction of the tubular structure in order to form sealing seams. This reduces the risk of the container's unintentionally tearing open in the region of the folds, i.e. of the container bottom. The folding edges located beside a sealing seam can, for example, form a loop in cross-section, so that, if the sealing seam tears open, the contents of the container are trapped by the loop and do not run out.

Transverse sealing seams in the film webs, which serve to seal the film web in a cross-machine direction, ought preferably to be designed in a saw-tooth shape or in some similar irregular manner in order to ensure that energy is transferred evenly during ultrasonic welding. In this way, the transverse sealing seams can, for example, also be designed as curved lines, whereas the cutting edges of the containers ought preferably to be straight, for optical reasons. An even energy transfer can also be achieved by feeding the film web obliquely towards a rotating guide roll and subsequently performing ultrasonic welding with an ultrasonic welding device. The most important point here, in view of the relatively high production speeds, is that any transverse seams which form suddenly, involving changing power input requirements, are avoided.

Ultrasonic cutting of the containers is preferably performed by punching out cutting lines in advance and releasing the pre-punched containers from the at least one film web. The advantage of pre-punched is that the tool is not exposed to so much wear, since the cutting tool no longer necessarily has to rest completely on the workbench or guide roll with the relatively powerful force required.

Especially in the production of container prototypes, it is advantageous for film webs to be folded in a frame and for the folded film webs to be moved on a supporting table relative to an ultrasonic welding device in order to shape the containers.

It is particularly preferred to use a method in which the at least one film web is pre-punched in order to create a weakened tearing line to open the container.

It can likewise be provided for at least one film web to be profiled in order to form the weakened tearing line to open the container.

The weakened tearing line is preferably worked in continuously.

It is particularly preferred for the weakened tearing line to be formed by pre punching or profiling by means of ultrasound. The tearing line ought preferably to be curved, in order to ensure an even transfer of energy during production of the tearing line.

It is also especially preferable if, in the case of a container manufactured from a multi-layer laminate, an inner film web of the container is designed more weakly in order to form the tearing line.

In addition, it can preferably be provided for a film web of the container to be weakened to form the tearing line before lamination of the film web.

The second object is achieved by a production facility for manufacturing thin-walled containers from film webs according to the method described above with advancing means for continuously feeding at least one film web, folding means for creating a tubular structure from at least one film web and for forming at least one fold projecting into the tubular structure, and at least one ultrasonic welding device for joining portions of film webs of the folded tubular structure lying flat and parallel on top of one another in order to form the containers.

A first embodiment of the production facility is characterised by two advancing means for continuously feeding one film web in each case, the advancing means being designed such that the film webs are capable of being guided over one another such that they are flat and parallel, an ultrasonic welding device for joining the longitudinal side edges of the film webs lying on top of one another being disposed in the region of the lateral edges in each case.

A second embodiment of the production facility is characterised by having two advancing means for continuously feeding one top-film web each, the advancing means being designed in such a way that the top-film webs are guided over one another such that they are flat and parallel, and two further advancing means for continuously feeding one side-film web towards the lateral edges of the top-film webs lying flat and parallel, one ultrasonic welding device being disposed in each case to join together the longitudinal lateral edges of the adjacent top and side film webs in the region of the lateral edges.

It is particularly advantageous if the ultrasonic welding device has a supporting table with ultrasonic vibrations applied to it for the film webs and a tool in contact with the film webs and the supporting table in the region of the junction points to be created. In this way, the tool can be easily adapted to the shape of the container to be manufactured, without the need to consider active parts of the ultrasonic generator or the propagation of waves in the tool.

BRIEF DESCRIPTION OF THE DRAWINGS

The invention will now be described in more detail with reference to the attached drawings, in which.

DETAILED DESCRIPTION OF THE INVENTION

Figures 1A, 1B, 1C:
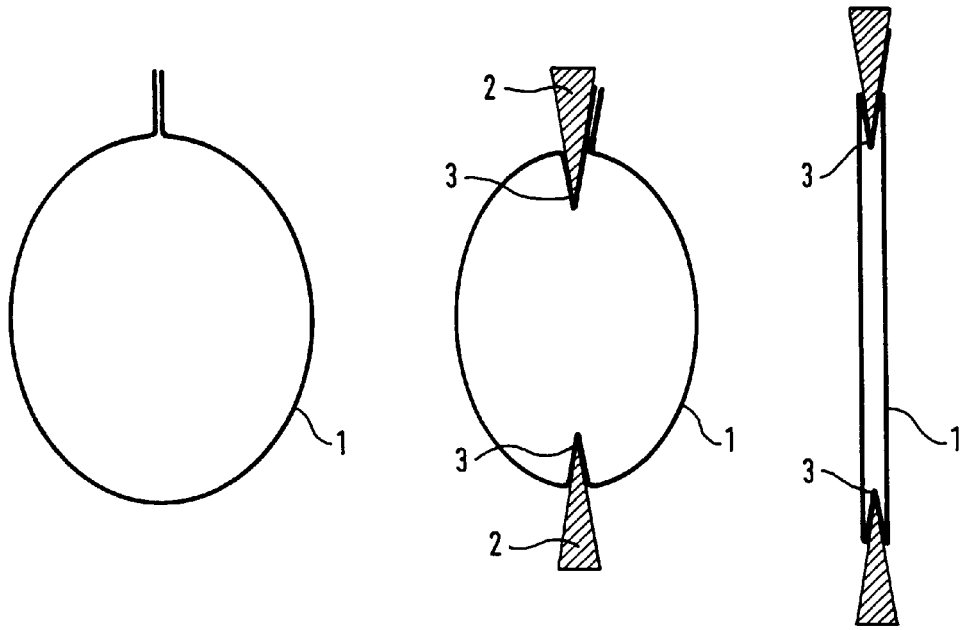
FIG. 1a shows a section view of a tubular structure which has been manufactured from a film web that has been folded back and welded along the longitudinal edge.
FIG. 1b shows a section view of the structure according to FIG. 1a with two diametrically opposing W-shaped folds.
FIG. 1c shows a section view of the structure according to FIG. 1b after drawing.

FIGS. 1a) to c) each show a section view of a tubular structure 1, which is produced from a film web folded over and fused at the longitudinal edge of mutually adjacent lateral edges 2. At two preferably diametrically opposing positions, the structure 1 is folded inwards. The folds 3 are preferably W-shaped. After that, the folded structure 1 is stretched, and then later on, the containers are shaped from the stretched structure 1 by ultrasonic welding and cutting.

Figure 2:
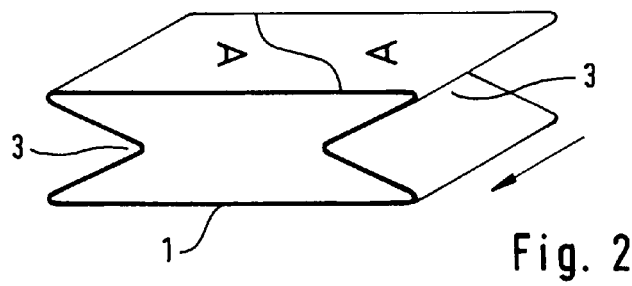
FIG. 2 shows a perspective view of the folded structure with two diametrically opposing W-shaped folds for subsequently producing containers.

The folds 3 serve here as bottoms for the containers to stand on. As can be seen from the perspective representation of the folded structure in FIG. 2, two container parts A per longitudinal portion can be produced in each case by cutting the structure 1 in the longitudinal direction. In order to make optimum use of the material, especially for the shaped containers with curved contours, the two diametrically opposing containers and their printed material should be symmetrical mirror images of one another.

Figure 3:
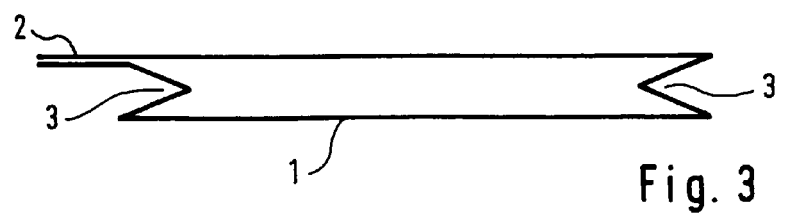
FIG. 3 shows a schematic section view of the folded structure from FIGS. 1 and 2.

FIG. 3 shows the structure 1 in a schematic section view. This makes it clear that a film web is folded over and welded together at the lateral edges 2 lying on top of one another. Next to the fused lateral edges 2 the structure 1 is folded in order to form a first W-shaped fold 3. A further fold 3 is provided diametrically opposite the first fold 3, the folds 3 each forming a bottom for the container to stand on when it is produced.

Figure 4:
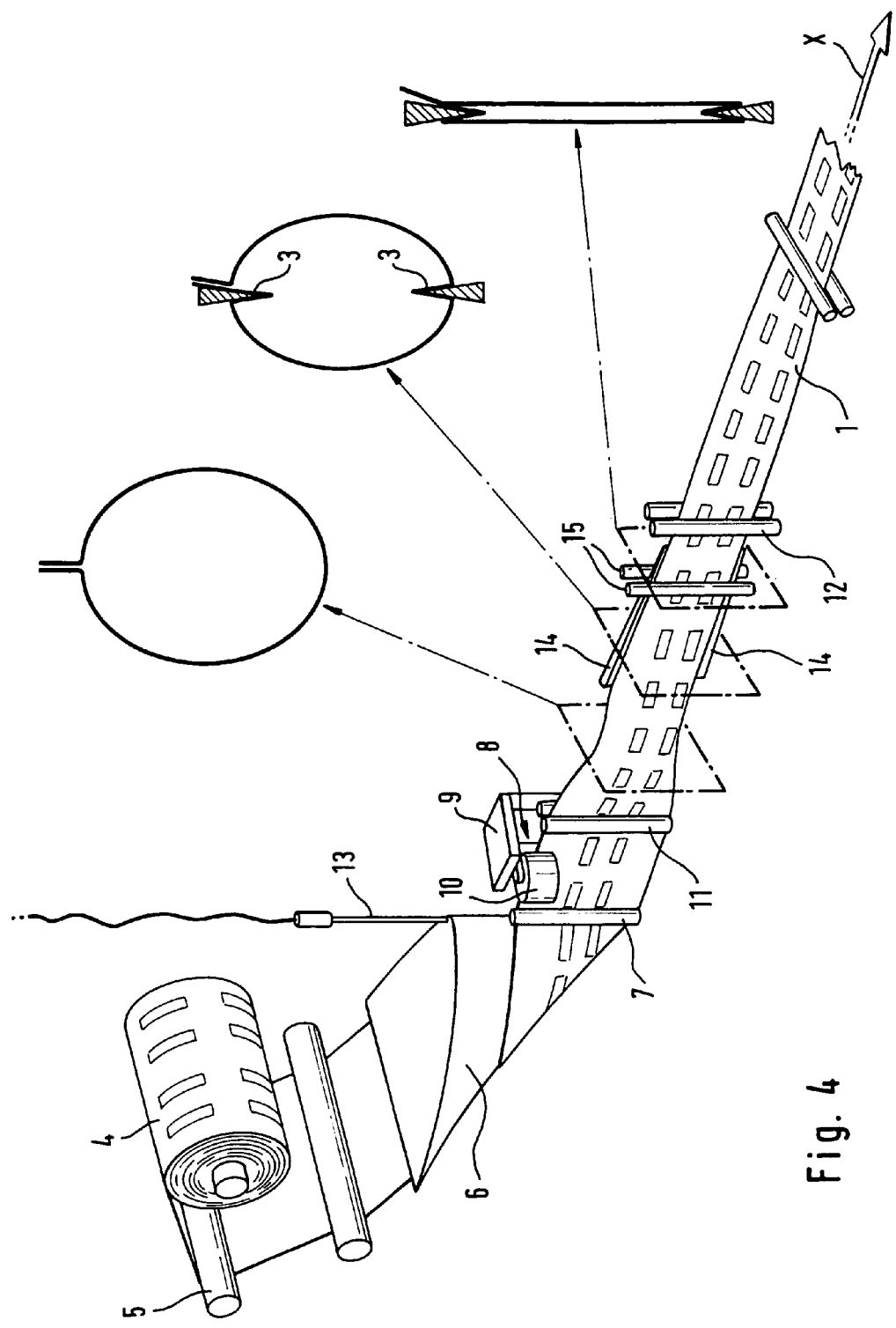
FIG. 4 shows a perspective view of a first embodiment of a production facility of the invention for producing tubular structures from two film webs.

FIG. 4 shows a production facility for manufacturing a tubular structure 1 from a film web 4, which is continuously unwound from a drum and guided by guide rollers 5 over a shaping wedge 6 and calender rolls 7 to fold the film web 4 over. At the upper edge of the folded film web, i.e. in the region of the longitudinal lateral edges, an ultrasonic welding device 8 is provided, in order to fuse together the mutually adjacent longitudinal lateral edges and thus to form the tubular structure 1. The ultrasonic welding device 8 has a fixed supporting table 9 to which an ultrasonic vibration is applied by means of a sonotrode, and a pressure roll 10 for pressing the longitudinal lateral edges of the film web 1 onto the supporting table 9. As a result of the pressure contact and the ultrasonic vibration, the film webs 1 located between the pressure roll 10 and the supporting table 9 are fused together.

Downstream of the ultrasonic welding device 8, further guide rolls 11 and 12 are provided. During the manufacture of the tubular structure 1, compressed air is blown into the structure 1 via a feed line 13, the guide rolls 11, 12 retaining the compressed air in the structure 1 and ensuring that the structure 1 is blown up into a hose-shaped balloon. By means of two plates 14 which act on the expanded structure 1 from the outside, the diametrically opposing W-shaped folds 3 are produced, the folds 3 being fixed with calender rolls 15 by drawing the folded structure 1. The folded and drawn structure 1 is then fed in a horizontal position in feed direction X to an ultrasonic welding punch and/or ultrasonic cutting punch in which the container seams and, optionally, sealing seams are formed and the containers are punched out.

Figure 5:
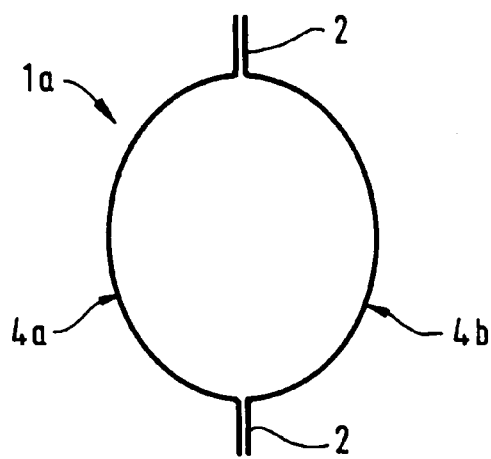
FIG. 5 shows a schematic section view of a structure produced from two film webs in accordance with an alternative embodiment of the invention.

FIG. 5 shows a second embodiment of a structure 1a, which is formed by fusing two film webs 4a, 4b lying flat and parallel on top of one another, which may be of the same or different widths as desired. The bottom for a container to stand on can be produced from one film web or both film webs as desired. It becomes clear that a seam 2 is accordingly provided in the longitudinal direction on both longitudinal lateral edges of the film webs 4a, 4b. Each seam 2 can be executed as a straight or curved line or as an area of variable width and can in this way increase the solidity and stability of the container.

Figure 6:
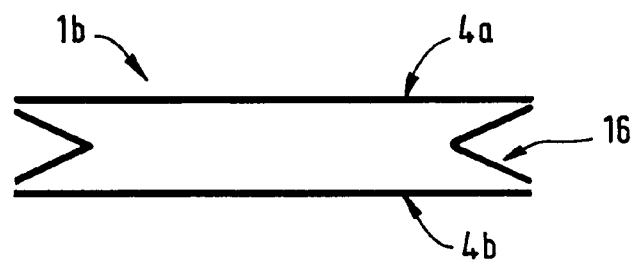
FIG. 6 shows a schematic section view of a folded structure made from two top-film webs and two side-film webs in accordance with a third embodiment of the invention.

FIG. 6 indicates a third embodiment of a structure 1b, which comprises two top-film webs 4a, 4b lying flat and parallel on top of one another and two V-shaped side-film webs 16 folded inwards. In order to produce a folded structure 1b, the respective adjacent longitudinal lateral edges of the top and side-film webs 4a, 16 or 4b, 16 respectively are fused together ultrasonically.

Figure 7:
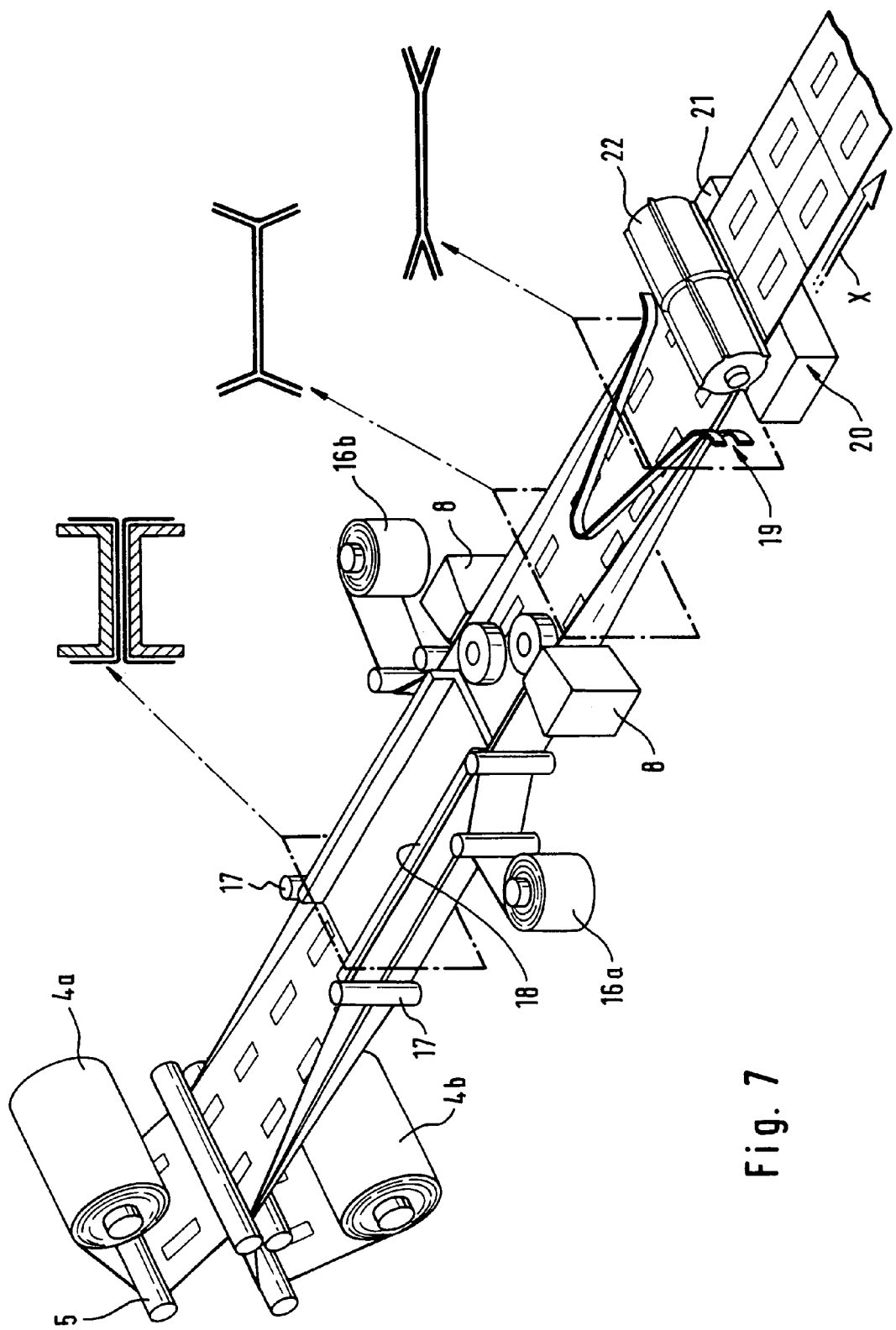
FIG. 7 shows a perspective view of a second embodiment of a production facility for manufacturing tubular structures from two top-film webs and two side-film webs.

FIG. 7 indicates an embodiment of a production facility for manufacturing the structure according to FIG. 6 with top and side-film webs 4a, 4b, 16a, 16b. The top-film webs 4a, 4b are first of all continuously unrolled from drums and guided flat and parallel to one another by guide rolls 5. Lateral guide rolls 17 are then used to urge apart the longitudinal lateral edges of the top guide webs 4a, 4b, which are guided by U-shaped bent deflection sheets 18. Side-film webs 16a, 16b, which are likewise continuously unrolled from drums, are then guided into these upwardly bent longitudinal lateral edges of the top-film webs 4a, 4b. Using ultrasonic welding devices 8 at both lateral edges of the top-film webs 4, the mutually adjacent longitudinal lateral edges both of a top-film web 4 and of a side-film web 16 are fused together, and in this way a hose-shaped folded structure 1b is produced. After that, the folded structure 1b is stretched with a stretching device 19 and fed horizontally to an ultrasonic welding/cutting device 20 to produce the longitudinal and transverse sealing seams and separation points for the containers. The ultrasonic welding/cutting device 20 has a supporting table 21 with ultrasonic vibrations applied and a forming roll 22 with the contours, of the seams and separation points to be formed. The supporting table 21 is flat and can thus be used universally. Only the passive forming roll 22 needs to be adapted to the contours to be created.

Figure 8:
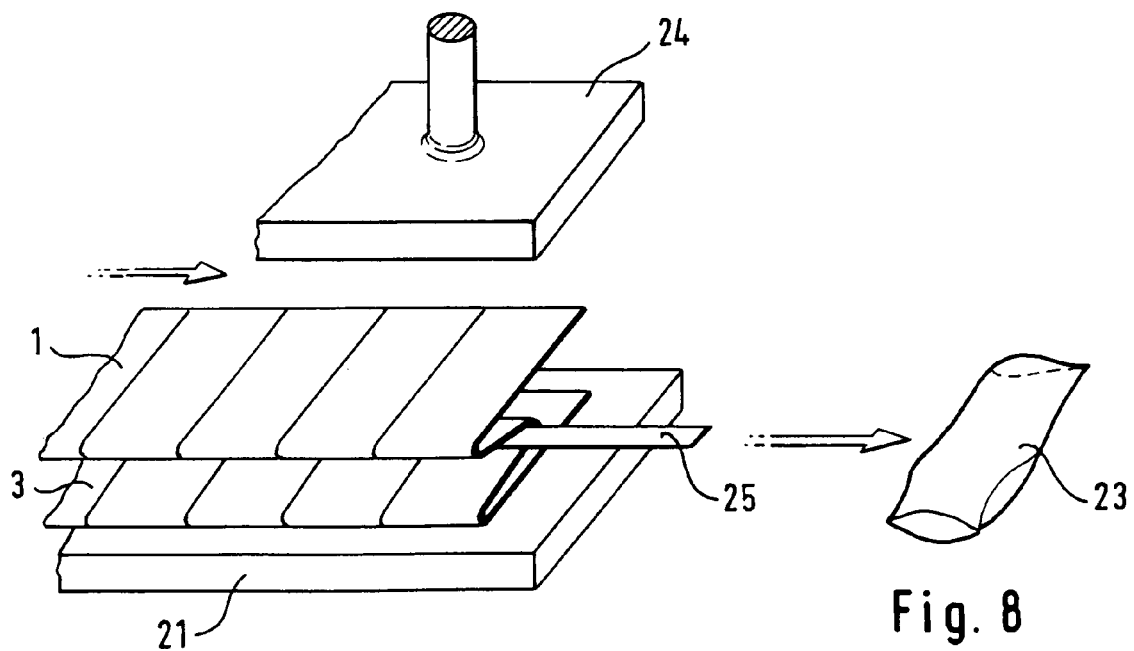
FIG. 8 shows a perspective view of an ultrasonic-welding device for shaping containers from folded tubular structures.

FIG. 8 indicates a different embodiment of an ultrasonic welding/cutting device 20 for forming the containers 23 from the folded structures 1. In this case, the seams and cutting points are formed with a corresponding passive punch 24, which is pressed onto an active supporting table 21 with ultrasonic vibrations applied to it.

It can further be seen from FIG. 8 that a metal strip 25 is inserted into the fold 3, which serves on the one hand to form the fold 3 and, on the other hand, is designed in such a way that no seam point is created in the region of the metal strip 25. In this way, when transverse seams are produced, only the corners of the W-shaped folds 3 need to be fused together, thus creating a container bottom which can stand securely, and whose standing surface will automatically be enlarged to the optimum extent because of the weight of the product with which it is filled.

As an alternative to this, the fusing or sealing of certain layers or regions can be prevented by a revolving disc, a cutting member which can be swung out by an articulation, or a material applied to, the film web e.g. release varnish).

Figure 9:
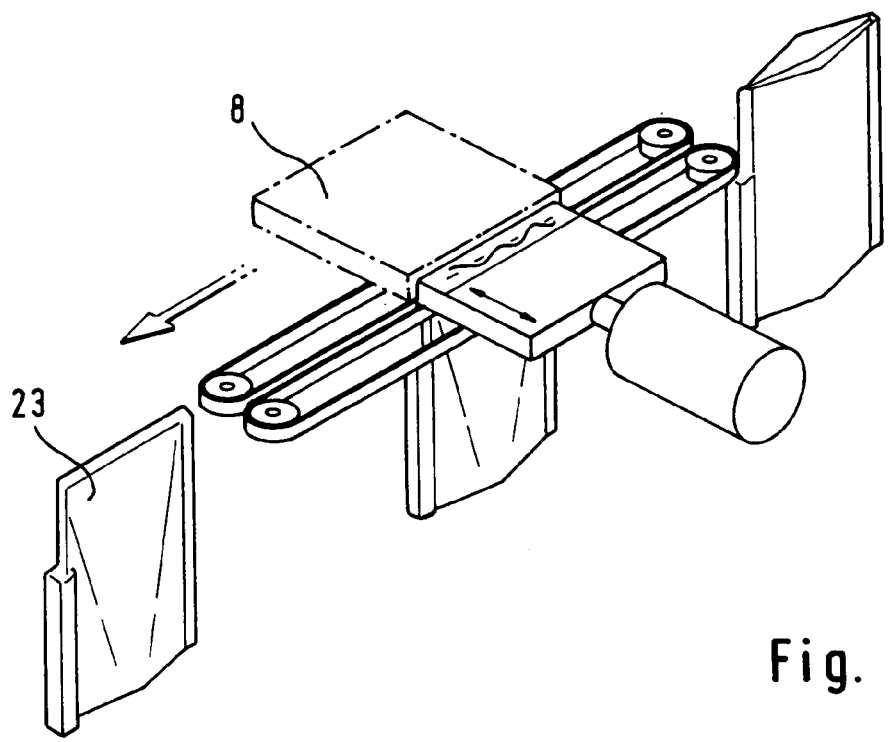
FIG. 9 shows a perspective view of an ultrasonic-welding device for sealing filled containers.

After the container 23 has been filled, the upper opening is sealed in a known manner. This can be done, as shown in FIG. 9 for example, by means of continuous ultrasonic welding by the ultrasonic welding device 8.

Figure 10:
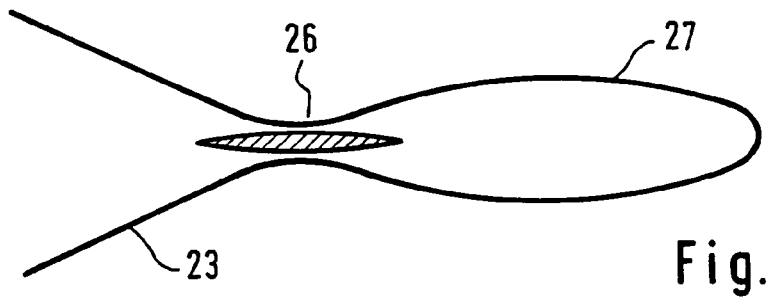
FIG. 10 shows a schematic section view of a sealing seam with an adjacent loop.

FIG. 10 shows a section of a container 23 with a sealing seam 26, which is provided for sealing purposes and to prevent the unintentional tearing of the container 23 in the region where the film web 4 is buckled. In the event that the sealing seam 26 leaks or fails, the buckling point in the film web 4 forms a loop 27 adjacent to the sealing seam, in which any fluid unintentionally escaping through the sealing seam 26 is trapped. Furthermore, the formation of loops 27 acts as a precaution against possible damage especially to the multi-layer films at the sharp buckling points.

Figure 11:
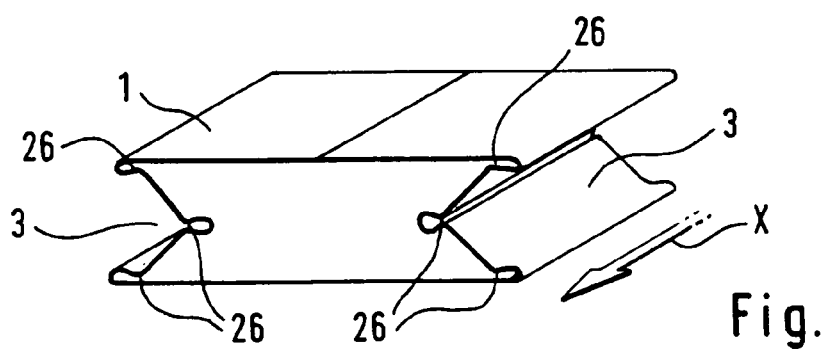
FIG. 11 shows a perspective view of a folded structure with sealing seams.

FIG. 11 indicates a perspective view of a folded structure 1, in which sealing seams 26 are provided at each of the three buckling points in the folds 3, which extend in the longitudinal direction X. The sealing seams 26 are advantageous particularly at these buckling points, because these buckling points are the weakest parts of the container 23.

In order to make reliable fusing or sealing of more than one layer of material possible, the longitudinal and transverse sealing ought to be performed at different stations. Via sealing stations upstream the film web 4 is sealed along the longitudinal seams before entering cylinder sealing stations. The cylinder sealing station then effects the transverse sealing.

Alternatively, it is also possible first to seal only the inner central fold of the W-shaped fold 3.

It is also possible, in the region of thicker layers of material, to adapt the geometric shape of the tool and/or of the supporting table locally, by, for example, forming indentations/elevations in the sealing or cutting edges.

Figure 12:
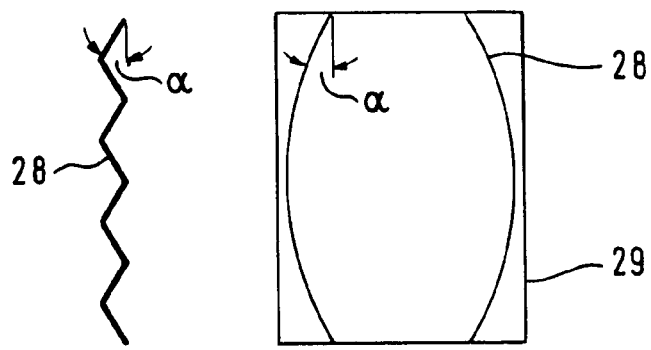
FIG. 12 shows a schematic representation of saw-tooth-shaped or curved junction seams.

In the production of ultrasonic welding seams, attention should be paid to ensuring an even transfer of energy to the film webs 4. For this reason, any transverse seams which form suddenly, involving changing power input requirements, should be avoided. For this purpose, it is, proposed that the seams 28 should be designed with a saw-tooth shape, for example (such as at an angle of about 5°), or curved, as shown in FIG. 12. In that case, however, the cutting lines 29 ought preferably to be straight, for optical reasons.

Figure 13:
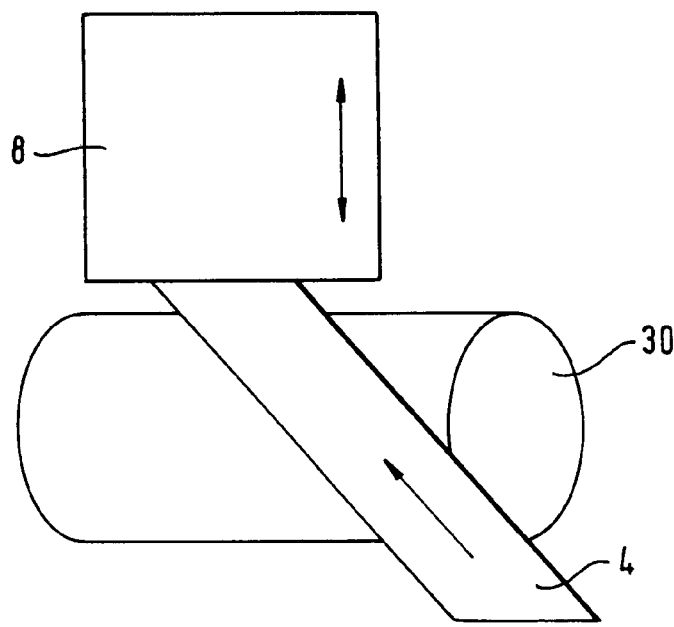
FIG. 13 shows a perspective sketch of a guide roll with a structure fed obliquely towards the guide roll.

An even transfer of energy can also be achieved, as sketched in FIG. 13, by feeding the film web 4 obliquely towards a guide roll 30, with an ultrasonic welding device 8 either acting directly on the guide roll or adjacent to it. The angle of attack is preferably about 2 to 5° and determines the geometry of the working edges on the guide roll 30.

Figures 14A, 14B:
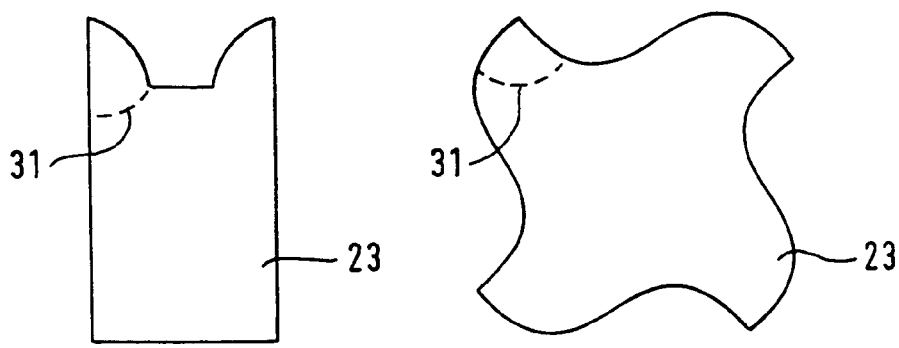
FIG. 14 shows a schematic view of containers with curved tearing seams.

FIG. 14 shows a container 23 in a frontal view with a tearing line 31. The tearing line 31 is preferably created by weakening the film web 4, wherein, for example, an inner film web is optionally discontinuously perforated or continuously pre-punched and/or profiled. This can be done, for example, by a profiled roll before or after lamination of a film web, which is moved along the tearing line 31 on an ultrasound supporting table.

The tearing line 31 is preferably curved in order to ensure the optimum input of energy and ease of opening.

The features of the invention disclosed in the above description, in the claims and in the drawings may be essential either individually or in any combination in order to carry out the invention in its various embodiments.

What is claimed is:

1. A method of manufacturing thin-walled containers from film webs comprising the steps of:
    manufacturing a tubular structure from at least one film;
    forming at least one fold projecting into the tubular structure, wherein the fold includes an intermediate layer, the intermediate layer preventing the film webs from fusing in the area of the intermediate layer;
    ultrasonically joining sections of film webs lying flat and parallel on top of one another in the folded tubular structure to form the containers;
    ultrasonically cutting the containers by punching out cutting lines in advance and releasing the pre-punched containers from the at least one film web, thereby shaping the containers.

2. The method as claimed in claim 1, wherein the tubular structure is produced from a film web by folding over the film web in the longitudinal direction of the film web and joining together the adjacent lateral edges of the folded film web.

3. The method as claimed in claim 1, wherein the tubular structure is manufactured from two film webs lying flat and parallel on top of one another, by joining together the adjacent lateral edges of each of the two film webs.

4. The method as claimed in claim 1, wherein the tubular structure is manufactured by placing two flat, parallel top-film webs together, one on top of the other, moving one side-film web in each case to the lateral edges of the flat, parallel top-film webs lying on top of the other, folding in the side-film webs and joining the respective mutually adjacent lateral edges of a side and top-film web.

5. The method as claimed in claim 1, wherein two diametrically opposing folds are formed in the tubular structure.

6. The method as claimed in claim 5, wherein the folds are W-shaped.

7. The method as claimed in claim 5, wherein ultrasonic welding and ultrasonic cutting are used to shape contours of the container in the area between the two diametrically opposing folds, wherein the area of the folds is designed as the bottom of the container.

8. The method as claimed in claim 1, wherein compressed air is blown into the at least one film web while manufacturing the tubular structure.

9. The method as claimed in claim 1, wherein the intermediate layer is a metal coating joined integrally to the at least one film web.

10. The method as claimed in claim 1, wherein the intermediate layer is a disc rotating in the fold.

11. The method as claimed in claim 1, wherein the intermediate layer is a metal strip used to form the fold.

12. The method as claimed in claim 1, wherein the film webs are fused together in the vicinity of their folding edges in the longitudinal direction of the tubular structure in order to form sealing seams.

13. The method as claimed in claim 12, wherein the folding edges located beside a sealing seam form a loop in cross-section.

14. The method as claimed in claim 12, wherein sealing seams in the film webs include transverse sealing seams designed in a saw-tooth shape.

15. The method as claimed in claim 14, wherein the transverse sealing seams form curved lines, and the containers have cutting edges that are straight.

16. The method as claimed in claim 1, wherein the film web is fed in an oblique direction towards a rotating guide roll and subsequently ultrasonic welding is preformed with an ultrasonic welding device.

17. The method as claimed in claim 1, wherein the film webs are folded in a frame and the folded film webs are moved on a supporting table relative to an ultrasonic welding device in order to shape the containers.

18. The method as claimed in claim 1, wherein at least one film web is pre-punched in order to create a weakened tearing line to open the container.

19. The method as claimed in claim 1, wherein at least one film web is profiled in order to form the weakened tearing line to open the container.

20. The method as claimed in either of claims 18 or 19, wherein the weakened tearing line is worked in continuously.

21. The method as claimed in either of claims 18 or 19, wherein the weakened tearing line is formed by pre-punching or profiling by means of ultrasound.

22. The method as claimed in claim 18, wherein the tearing line is designed in a curved shape.

23. The method as claimed in claim 18, wherein in a container manufactured from a multi-layer laminate, an inner film web of the container is formed more weakly in order to form the tearing line.

24. The method as claimed in claim 18, wherein a film web of the container is weakened to form the tearing line before lamination of the film web.

25. The method as claimed in claim 1, wherein the intermediate layer is part of the at least one film or is a separate device.

26. An apparatus for manufacturing thin-walled containers from film webs according to the method of claim 1, the apparatus comprising:

advancing means for continuously feeding at least one film web;

folding means for creating a tubular structure from at least one film web and for forming at least one fold projecting into the tubular structure wherein the fold includes an intermediate layer, the intermediate layer preventing the film webs from fusing in the area of the intermediate layer;

at least one ultrasonic welding device for joining portions of film webs lying flat and parallel on top of one another in the folded tubular structure in order to form the containers;

at least one ultrasonic cutting device for punching out cutting lines in advance and releasing the pre-punched containers from the at least one film web.

27. The apparatus as claimed in claim 26, further comprising two advancing means for continuously feeding at least one film web, the advancing means being designed such that the film webs are capable of being guided over one another such that they are flat and parallel, wherein an ultrasonic welding device for joining the longitudinal side edges of the film webs lying on top of one another is disposed in the region of the lateral edges of the at least one film web.

28. The apparatus as claimed in claim 26, further comprising two advancing means for continuously feeding one top-film web each, the advancing means being designed in such a way that the top-film webs are guided over one another such that they are flat and parallel, and two further advancing means for continuously feeding one side-film web for each top-film web towards the lateral edges of the top-film webs lying flat and parallel, one ultrasonic welding device being disposed for each to join together the longitudinal lateral edges of the adjacent top and side-film webs in the region of the lateral edges.

29. The apparatus as claimed in claim 26, wherein the ultrasonic welding device has a supporting table with ultrasonic vibrations applied to it for the film webs and a tool in contact with the film webs and the supporting table in the region where seams and separation points are formed.

* * * * *